United States Patent [19]

Anderson et al.

[11] E Re. 29,192

[45] Reissued Apr. 26, 1977

[54] SLIP PALLET

[75] Inventors: Raymond F. Anderson, Arvada; Ronald C. Mackes, Northglenn; Richard Edwin Andrews, Arvada; Patrick Maurice Mawe, Wheat Ridge, all of Colo.

[73] Assignee: BQP Industries, Inc., Denver, Colo.

[22] Filed: Apr. 22, 1975

[21] Appl. No.: 570,381

Related U.S. Patent Documents

Reissue of:

[64] Patent No.: 3,776,145
Issued: Dec. 4, 1973
Appl. No.: 243,507
Filed: Mar. 27, 1972

[52] U.S. Cl. ..... 108/51.3; 108/55.3; 214/10.5 R

[51] Int. Cl.[2] ..... B65D 19/00

[58] Field of Search ..... 108/51–58; 248/346, 49.5; 229/30; 206/72, 73; 214/10.5 R

[56] References Cited

UNITED STATES PATENTS

| | | | |
|---|---|---|---|
| 2,328,397 | 8/1943 | Neuman | 108/57 X |
| 2,593,998 | 4/1952 | Dupuis | 214/10.5 R |
| 2,913,206 | 11/1959 | Paris | 108/51 |
| 3,351,264 | 11/1967 | Bostrom | 214/10.5 R X |
| 3,369,676 | 2/1968 | Swetnam | 214/10.5 R |
| 3,490,583 | 1/1970 | Cook | 206/386 |
| 3,527,344 | 9/1970 | Taus et al. | 206/503 X |
| 3,540,959 | 11/1970 | Connor | 264/284 X |
| 3,567,067 | 3/1971 | Weiss | 206/72 X |
| 3,727,825 | 4/1973 | Troth | 229/32 |

FOREIGN PATENTS OR APPLICATIONS

| | | |
|---|---|---|
| 650,703 | 2/1951 | United Kingdom |

*Primary Examiner*—Roy D. Frazier
*Assistant Examiner*—William E. Lyddane
*Attorney, Agent, or Firm*—Hume, Clement, Brinks, Willian, Olds & Cook, Ltd.

[57] ABSTRACT

A slip pallet formed as a square or rectangular sheet of a synthetic resin of selected types of polyolefin. The sheet is proportioned to fit upon a platen lift and includes tabs at each edge to be gripped when the platen is thrust underneath the sheet or the sheet is pulled upon or pushed off from the platen. The slip pallet will ordinarily carry loads of boxes formed as interlocking layers and an important feature of the invention resides in providing a sheet having a greater coefficient of friction at the upper surface whereon the boxes are placed, than at the undersurface which is contacted by the platen.

8 Claims, 16 Drawing Figures

SLIP PALLET

Matter enclosed in heavy brackets [ ] appears in the original patent but forms no part of this reissue specification; matter printed in italics indicates the additions made by reissue.

This invention relates to pallets, and more particularly to improvements in slip pallets.

The background of the invention concerns the practice of palletizing merchandise, as in warehouses. Canned goods, bottled goods, beer and the like are ordinarily packaged in cardboard boxes which are proportioned to hold several dozen cans to permit a man to easily handle a single box. However, over the past 20 years, the practice of handling boxed merchandise stacked on pallets with forklift trucks has become a standardized warehouse procedure because of the enhanced economies possible over manually handling large number of boxes. A common type of pallet is formed as a flat-board surface supported upon short, spaced rails so they are about four inches thick. In use, the forks of a forklift truck move into the pallet underneath the flat surface between the rails to lift the pallet and the stack of merchandise upon it.

A more sophisticated development in this art involves the use of slip pallets which are ordinarily made of flat sheets of chip board, or similar heavy, cardboard-like material in the order of ⅛-inch thick. In use, a slip pallet is placed upon a flat surface to support a stack of boxes upon it. Slip pallets are desirable over regular pallets in many installations because they are much cheaper and because the space savings possible with the thin pallets is significant in many warehouses. A special type of lifting surface is required for slip pallets, and the forks of a forklift truck cannot be used. Instead, a flat, spatula-like member, commonly called a platen, is mounted upon the lift truck. In using a platen lift to pick up a load consisting of a stack of boxes, the platen is elevated so that its extended leading edge is beneath the slip pallet and it is then pushed underneath the slip pallet to engage and pick up the slip pallet and its load. Subsequently, the truck will move the load to where it is to be relocated, and the load and the slip pallet are pushed off the platen.

Several problems have been encountered in developing the slip pallet system. For example, it was found necessary to grip the edge of the slip pallet and hold the same in tension whenever the platen was moved underneath it to pick up the load. In unloading the platen, it was found necessary to use a positive pushing action to push the slip pallet and the load off the platen. Thus, a lift truck carrying a platen is provided with a special push-pull attachment which overlies the platen. This attachment includes a transverse abutment wall which extends to the leading edge of the platen and retracts to the opposite back of the platen. A gripper along the lower edge of the abutment wall will grip a pull tab at the edge of the slip pallet to assist in holding the pallet and its load while the abutment wall is retracting and the platen is being pushed underneath the pallet. The abutment wall will thereafter extend to push the pallet and its load off the platen.

Chipboard sheets, heretofore found to be the best suited for slip pallets and almost universally used for the purpose, are usually damaged every time a load is moved. Often, when the pull tab of the pallet is being held while the platen is being pushed underneath it, the pull tab will be torn away and the pallet will buckle against the pressure of the platen. Also, in pushing the pallet and its load off the platen, the frictional resistance between the pallet and the platen will damage the chipboard. As a result, an average chipboard slip pallet can be used only once or twice before it must be replaced.

Heretofore, various experiments with several types of materials have been conducted in an effort to replace chipboard type slip pallets and such experiments have generally been unsuccessful for various reasons. Apparently, the slip pallets must have certain properties of rigidity and toughness over a wide range of temperatures. Also, the frictional resistance between the surface of a pallet and the platen and the frictional resistances between the surface of the pallet and the box materials carried on the pallet must be in selected ranges in order for the pallets to function properly. The needed necessary properties have not been readily apparent nor easily defined.

The present invention was conceived and developed with the foregoing and other considerations in view and comprises, in essence, a slip pallet formed as a rectangular sheet of a selected type of thermoplastic polyolefin resin. The form of the plastic pallet is similar to that of a conventional chipboard slip pallet. However, it was found that the plastic sheet had to be specially constructed and that more than a mere substitution of materials was required. Not only was it necessary to use plastic sheets having selected properties, but also, the plastic sheets had to have differing physical properties at their upper and lower surfaces. The plastic slip pallet is also formed with gripping pull tabs about its edges which are angled upwardly by shallow compression grooves to permit easy gripping by the push-pull attachment above the platen on the lift truck, without impairing the strength of the pallet, all as hereinafter set forth in detail.

It follows that the primary object of the present invention is to provide a novel and improved plastic slip pallet which overcomes the objections directed towards conventional chipboard pallets.

Another object of the invention is to provide a novel and improved plastic slip pallet which can be used and re-used many times without being damaged, and which, when eventually damaged or discarded, can be recycled to be formed into a new pallet.

Another object of the invention is to provide a novel and improved plastic slip pallet which is exceptionally tough and strong and which will withstand repeated rough usage at differing temperature and humidity environments found in various warehouses.

Another object of the invention is to provide a novel and improved plastic slip pallet having its surfaces selectively finished to render the pallet effective in holding loads upon the pallet, while at the same time permitting a platen to easily slip underneath the pallet when loading and unloading the pallet upon the platen.

Other objects of the invention are to provide, in a novel and improved plastic slip pallet, a unit which is simple, versatile, rugged and tough and which provides a desirable economy and efficiency in warehousing operations.

With the foregoing and other objects in view, the present invention comprises certain constructions, combinations and arrangements of parts and elements as hereinafter described, defined in the appended claims, and illustrated in preferred embodiment by the accompanying drawing in which:

Figure 1:
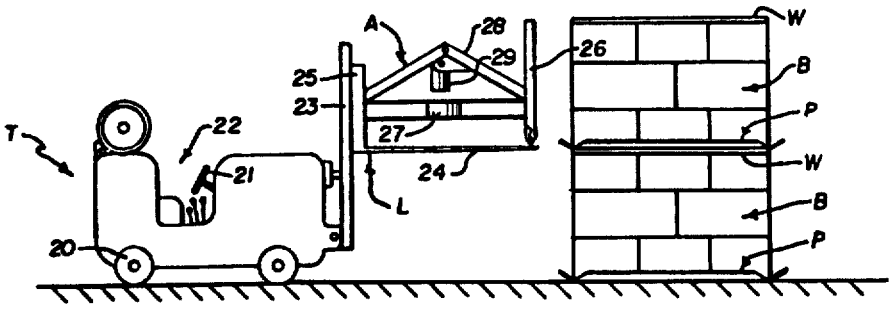
FIG. 1 is a small scale sketch showing a side elevational view of a lift truck carrying a platen and a push-pull attachment above it, and showing further, two loads of boxes stacked, one upon the other and separated by a slip pallet, the figure being exemplary of the manner in which the slip pallets are used and the type of apparatus used to handle them.
Figure 2:
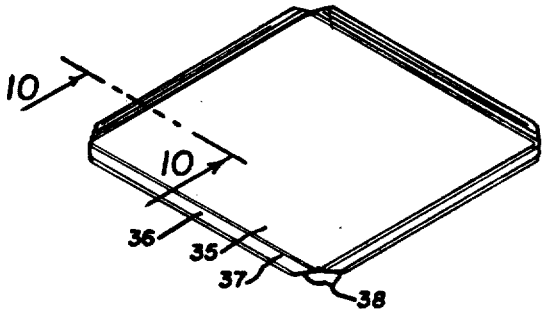
FIG. 2 is a perspective view of a slip pallet per se, constructed according to the present invention.
Figure 3:
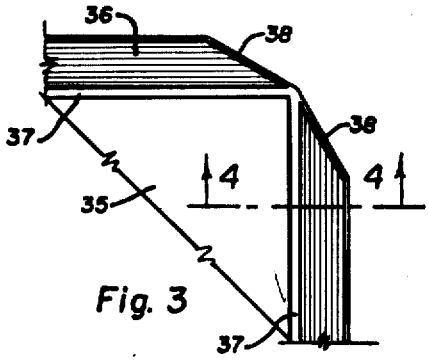
FIG. 3 is a plan view of a corner portion of the pallet shown at FIG. 2, but on an enlarged scale.

Referring more particularly to the drawing, a typical use of a slip pallet is illustrated at FIG. 1, which is exemplary of the manner in which box loads B are stacked in a warehouse upon slip pallets P. A slip pallet per se is illustrated at FIG. 2 as a flat, rectangular or square sheet having pull tabs as hereinafter described in detail. First, however, the manner in which slip pallets are used and the apparatus for using them will be described to provide a better understanding of the operative problems encountered in the use of slip pallets and the need for the improvements disclosed in the present invention.

In the usual storage operation, the length and width of boxes are proportioned in such a manner as to permit a box load B which is carried upon a slip pallet P to be made up of a selected number of layers of boxes with each layer of boxes forming a rectangle or square of selected proportions which is the same size as the slip pallet P. The boxes of each layer in the load are arranged in an interlocking pattern with respect to the boxes of adjacent layers to maintain the integrity of the load. In the drawing, each load of boxes B is depicted as having a square base with six boxes in each layer and being three layers high and with the boxes in the layers arranged in an interlocking pattern. To complete each box load, a plywood sheet W is placed upon the top of each box load to form a protective surface whereon a slip pallet P of the upper load will rest. Two such box loads are illustrated, with one being stacked upon the other and with each box load being carried upon a slip pallet P. Such is illustrative only and the number of layers in a box load may be considerably more than the three illustrated. Also, the number of loads forming a stack can vary and such will depend entirely upon the size and weight of the boxes, and the capacity and reach of the platen lift L.

The platen lift L, which will pick up a box load upon a slip pallet, will be carried upon a truck T of a type ordinarily referred to as a fork lift truck and indicated in a somewhat diagrammatic manner at FIG. 1. This truck T is provided with driving wheels 20, a steering wheel 21, a suitable power plant, not shown, and an operator's section 22 where controls for driving the truck and for raising and lowering and otherwise operating the platen lift L are located. The platen lift is carried upon a normally vertical guide 23 at the front of the truck. Suitable controls and mechanisms will tip this guide 23 forwardly or rearwardly from its vertical position and raise and lower the platen lift along the guide, all in a conventional, well-known manner. The platen 24 of the lift is a comparatively thin, spatula-like sheet affixed to an upright backstop 25 which, in turn, is mounted on the vertical guide 23. The width and depth of this platen 24 is selected to hold a pallet P and to accommodate a box load B such as in the stack illustrated at FIG. 1. It is contemplated that even though several types of boxes are used in a given warehouse operation, they will all be proportioned in such a manner as to form box loads which fit upon the pallets P and upon the platen lift L, all in the interest of economy of handling operations.

Figure 6:
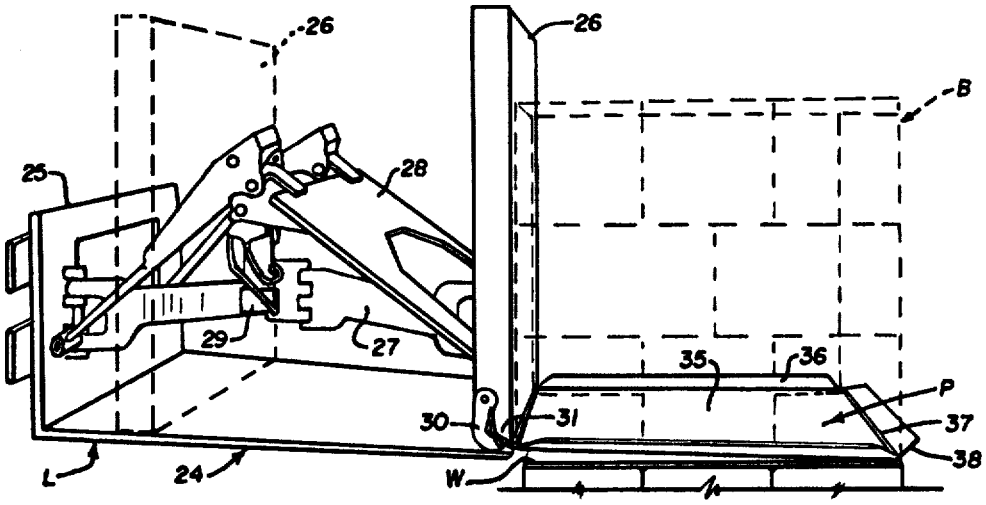
FIG. 6 is a perspective view of the platen of the lift truck with its push-pull attachment being extended to the end of the platen and gripping the tab of a slip pallet, the view depicting further, in dotted lines, the outline of a box load upon the slip pallet and also, the retracted position of its push-pull attachment.

As illustrated at FIGS. 1 and 6, the platen lift L will include a push-pull attachment A, which is mounted upon the backstop 25 of the platen. This push-pull attachment includes a shiftable abutment 26 held in a vertical transverse position above the platen by a horizontal swing arm 27 and secured in a transverse relationship with respect to the edges of the platen by a comparatively wide upward fold arm 28 attached to the backstop 25 and to the back face of the abutment 26. Suitable hydraulic rams 29 coact with this arm to push the abutment wall 26 forwardly and to the forward leading edge 24a of the platen, as illustrated, and to pull the abutment 26 rearwardly towards the backstop 25 as indicated in broken lines at FIG. 6. Suitable controls at the operator's section 22 regulate this push-pull movement of the abutment 26 as well as the raising and lowering and tipping of the platen 25. It is thus a simple matter for the truck operator to position the leading edge 24a of the platen 24 against the under edge of a pallet P when the truck is moved against a stack of box loads B.

An elongated gripper 30 is pivotally mounted at the back side of the abutment 26 and it is adapted to swing against the undersurface 31 of the abutment 26 to grip and hold a pallet tab as will be described. The gripper is operated by conventional hydraulic pressure members within the framework of the abutment 26 which are not shown. The undersurface 31 slopes upwardly and rearwardly from the bottom edge of the front of the abutment and the gripper 30 is formed as a hook-like member having a projecting, finger-like edge which swings into and against this surface 31 without projecting below the front bottom edge of the abutment. Thus, an upturned pallet tab can be gripped and held at the bottom of the abutment, with the bottom of the abutment being closely adjacent to the top surface of the platen 24, and with the platen thus being positioned to move underneath the slip pallet P.

The improved slip pallet P is a sheet of a selected blend of polyolefin resin as hereinafter described. This sheet is comparatively thin for its size and a practical range of thickness is from approximately 20-mils to 125-mils, and preferably, in the range of 1/16-inch. This sheet is rectangular or square and is proportioned to hold a selected box load B and to set upon the platen 24.

The sheet forming the slip pallet P will include the rectangular or square central area 35 for the box load and one or more marginal pull tabs 36 at the edges of this central area. Preferably, a pull tab will extend from each of the four edges of the central area as illustrated. Thus, while only one pull tab 36 will be used at a time, several advantages are to be gained with a pull tab projecting from each side of the pallet. In the first place, if one tab is accidentally torn away, the pallet is still useable. Also, with four tabs, the pallet may be gripped and loaded onto the platen from any direction.

Figure 4:
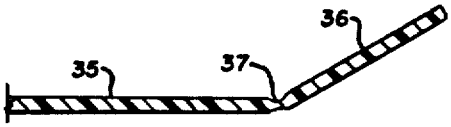
FIG. 4 is a fragmentary sectional portion as taken from the indicated line 4—4 at FIG. 3, but being somewhat exaggerated in thickness to better illustrate the construction thereof.
Figure 5:
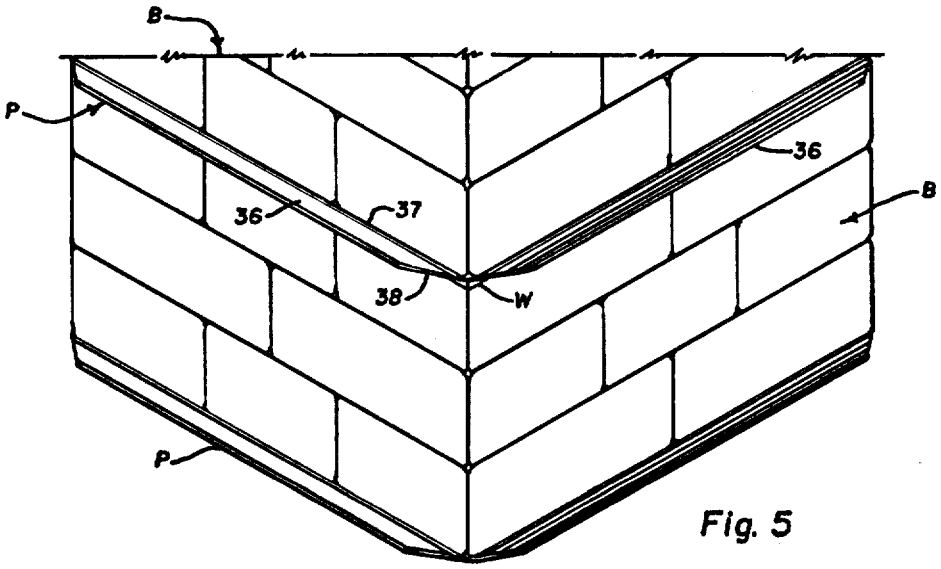
FIG. 5 is an isometric view of a portion of the stacked box loads shown at FIG. 1, showing pull tabs of the slip pallets protruding from the sides of the stack.

To facilitate the gripping of a tab 36 at the undersurface of the abutment, each pull tab is folded upwardly at an angle of about thirty degrees from the plane of the central area 35 by creases 37. Such creases may be pressure and/or heat formed in the surface of the pallet and may be formed at one, or at both sides of the pallet as illustrated at FIG. 4. To complete the pallet, each corner 38 of each tab is cut at an angle of approximately 45° with respect to the tab edge, so a tab corner will not interfere with an adjacent corner as when the tabs are folded upwardly.

Figure 7:
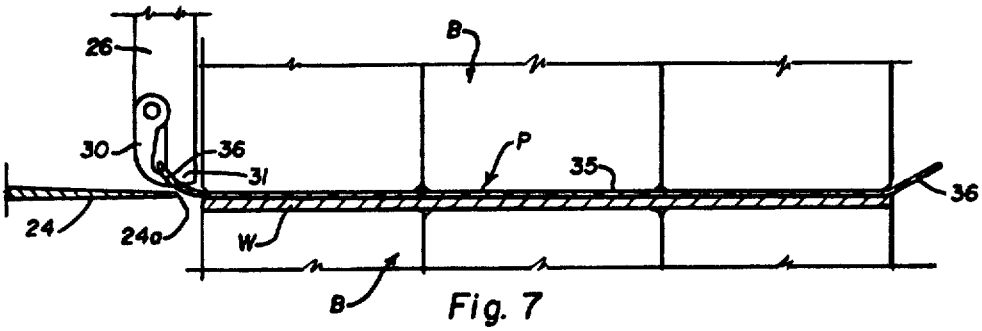
FIG. 7 is a fragmentary sectional view showing a portion of the stacked box loads with the boxes being separated by a slip pallet and with the pallet being gripped by the push-pull attachment of the platen lift preliminary to picking up the pallet and the box load upon it.
Figure 8:
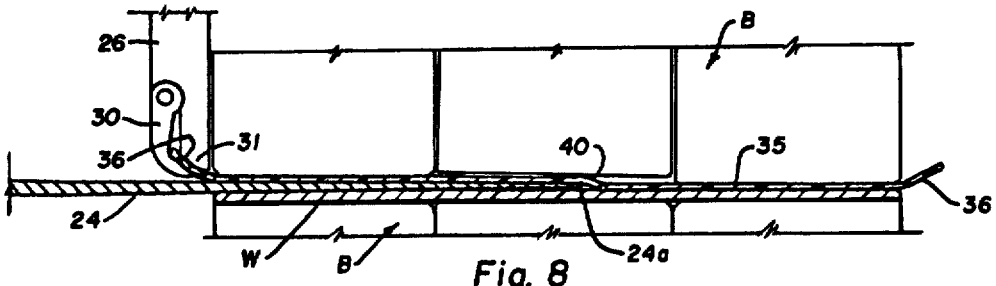
FIG. 8 is a view similar to FIG. 7 showing the platen as being thrust underneath the slip pallet as a step in picking up the pallet and the box load upon it.
Figure 9:
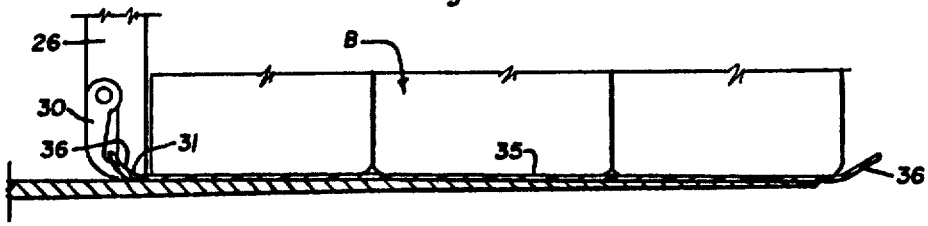
FIG. 9 is a diagrammatic view similar to FIG. 8, but showing the slip pallet and the box load as being carried by the platen.
Figure 10:
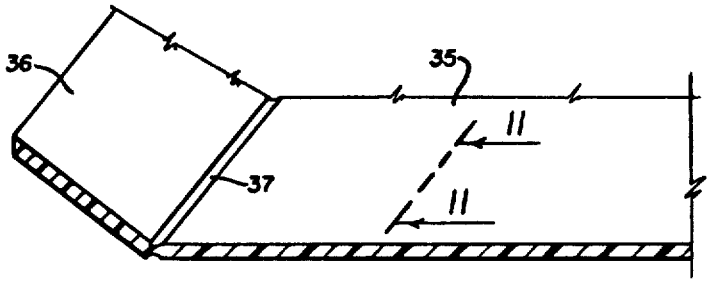
FIG. 10 is a fragmentary sectional perspective detail as taken from the substantially indicated line 10—10 at FIG. 2, but on an enlarged scale.

A better understanding of the problems arising in the use of a slip pallet, when the platen is moved underneath it, is possible by referring to FIGS. 7, 8, 9, 15 and 16. In moving the platen 24 underneath a slip pallet supporting a box load, the first steps are to adjust the elevation of the platen to the elevation of the pallet; extend the abutment 26; move the leading edge 24a of the pallet and abutment against the box load; and, grip and hold the projecting pallet tab 36 at the underside of the abutment, as shown at FIG. 7. The platen 24 then commences its movement underneath the pallet and the thin, spatula-like platen lifts the slip pallet and its load of boxes a small vertical distance, the thickness of the platen, as illustrated at FIG. 8. When the platen is completely underneath the slip pallet, as illustrated at FIG. 9, the box load B may then be lifted and transported by the truck T. It is to be noted that the preferred mode of loading a slip pallet upon the platen is to move the platen itself under the box load by movement of the truck carrying the platen. At the same time, the abutment 26 moves to its retracted position with respect to the platen, but remains stationary with respect to the box load. It is also possible to pull the box load onto the platen by moving the abutment 26 to its retracted position without moving the truck. However, this latter mode of loading the platen is not recommended because a much larger pulling force is required on the tab 36 being gripped by the abutment and this force could tear the tab from the central area 35, especially if the material forming the slip pallet does not have a high tensile strength.

Regardless of whether the platen 24 is thrust underneath the slip pallet P or the slip pallet is pulled onto the platen, the force pulling the tab 36 will be substantial. This will be caused by the friction between the undersurface of the pallet and the platen when the platen moves under the pallet and also, by a ripple 40 which forms in the pallet ahead of the leading edge 24a of the moving platen. This ripple 40 will assume various forms such as that illustrated at FIG. 15 and can become quite serious if the pallet is not effectively restrained. This ripple also requires that the material forming the pallet be tough and flexible, for otherwise, the leading edge 24a of the platen would move into this ripple to tear the pallet material. The pallet material cannot be brittle, otherwise the bending action of the ripple would cause it to crack.

When the box load B and its pallet P are to be discharged from the platen, the frictional drag between the pallet and the platen is in the opposite direction to the pull hereinabove described. In discharging the box load, the abutment 26 holds the box load while the platen is retracted from underneath it. To accomplish this, the truck T carrying the platen moves away from the box load while the abutment 26 is extended over the platen to push off the box load. This creates a substantial frictional force tending to pull the pallet from underneath the box load or buckle the pallet. A buckling action 41 will occur at the edge of the tab gripped by the abutment, as shown at FIG, 16. If the buckling 41 at this edge is severe, it can damage the hinge crease 37 to cause the tab to be torn away from the pallet during a subsequent use. This buckling 41 is especially serious when using chipboard pallets.

It has heretofore been proposed that sheets of synthetic resin plastic could be used for slip pallets. In considering the problem, many types of synthetic resins can be eliminated as having insufficient strength to withstand the pull against the tabs or as being too brittle to stand up under the ripple action which occurs when the platen moves underneath the pallet. The factor of cost also becomes important. A resin plastic sheet having the thickness of a quarter of an inch or more, such that the pallet is so rigid that it will withstand all stresses and not permit rippling or buckling actions, would function satisfactorily but it would be far too expensive for consideration. Thin, tough plastic sheets of high strength material were proposed and have been tried, but they have not heretofore performed satisfactorily. For example, when loading a box load onto a platen, the rippling 40 would become exaggerated and the leading edge 24a of the platen would move into a ripple at its fold and cut the sheet in half. In other instances in discharging a load, not only would a severe buckle 41 occur at the abutment 26, but also, an entire sheet would sometimes underfold upon itself. The tearing away of tabs was also a problem. In addition, a major problem was that the box load upon the pallet would shift off the pallet as the platen moved underneath it to pick up or to discharge the pallet. Thus, it had been concluded that if a plastic pallet were thin enough as to be price-competitive with the conventional, cheap chipboards, it would not be satisfactory.

Observations led to the conclusion that the rippling and buckling actions of the plastic pallets and the shifting of the loads upon them were caused by the frictional behavior between the box loads and the pallets and between the pallets and the platen. For smooth operation, the upper surface of a platen must slide freely along the undersurface of a pallet whenever the platen is being pushed underneath it or pulled therefrom. At the same time, the box load must not slide or shift upon the upper surface of the pallet. Thus, it is essential that the static frictional resistance of the box load B upon the pallet P be significantly greater than sliding frictional resistance of the platen underneath the pallet. The jostling and other small moves of the boxes which occur as the platen moves underneath the pallet, and the very nature of the material involved, does not permit such desirable friction effects to occur when using a plastic pallet formed in an ordinary manner by standard extruding apparatus.

The present invention requires the upper surface of a slip pallet be textured or otherwise modified to increase the frictional resistance between the upper surface and the box load upon it. Also, it is desirable to modify the undersurface of the pallet in a manner which will decrease the sliding frictional resistance between the undersurface of the pallet and the platen. To have a satisfactory pallet, it was found that the static frictional resistance between the pallet and the box load, which will be hereinafter designated as a coefficient of friction, should be at least 0.15 greater than the sliding coefficient of friction between the platen and the pallet and preferably, this difference should be as much as 0.25 or 0.30.

Significant differences between the friction coefficients at the upper and under surfaces of the plastic pallet sheets were obtained by providing a textured upper surface which was comparable in roughness to, or even exceeded the roughness of the surface texture of the cardboard of the boxes forming a box load. Such roughness produces an interlocking action between the upper surface of the pallet and the cardboard surfaces of the boxes to increase the effective frictional resistance to movement. Simple qualitative tests obtained by sliding small cardboard tabs upon various types of textured surfaces demonstrated surprising differences between the frictional resistance of a smooth plastic surface and of various surface textures. Such a simple test can be used to obtain an optimum degree of roughness of any selected texture at the upper surface of the pallet, for any given type of cardboard from which a box is to be made, in order to obtain the maximum possible frictional resistance.

While it would be anticipated that a minimum frictional resistance could be obtained between a smooth-surfaced, plastic sheet and the smooth, steel surface of a platen, it was found that the frictional resistance between the undersurface of the pallet and the platen could be minimized if the plastic sheet were roughened to a slight degree, apparently to permit air to be present between the plastic and steel surfaces and prevent an undesirable suction effect.

The textured surface of the plastic pellets can best be obtained when the web from which the pallets are formed is being manufactured. A standard manufacturing procedure for producing a web is by extruding hot thermoplastic material into the web form and thereafter, finishing the web by moving it about sizing and cooling rolls. The web will have a width sufficient to form a central section 35 and tabs 36 at each side of this central section. It will then be cut to length as the pallets are finished to provide the central section 35 and tabs 36 at all four edges. In a normal course of production, the web will pass about finishing and cooling rolls which will impart the smooth, slick surfaces ordinarily found in sheets of plastic materials. To provide a pallet according to the present invention, however, one of the finishing and cooling rolls about which the sheet moves is roughened to produce a textured surface which will become the upper face of the pallet. A suitable method for texturing this finishing and cooling roll is by sandblasting the surface of the roll, but other modes of roughening can also be used. A sandblasting operation need not be described in detail, since it is done conventionally for other purposes. It is to be noted that a suitable degree of texture roughness can be measured comparatively with known mold surface standards defined in micro-inches of depth. To assure a comparatively high coefficient of friction between the surface of a plastic pallet and the paper material of an ordinary cardboard box, a depth of approximately 60 micro-inches of surface roughness is satisfactory. A much rougher texture may be used and the ideal texture for any given box material can be found by simple tests hereinbefore described.

A suitable material for the improved plastic slip pallet having a preferred thickness of approximately 1/16-inch as heretofore described, can be selected from several types of polyolefin thermoplastic resins or compatible blends of the same. However, such material must be tough and pliable and capable of withstanding a substantial amount of abuse. A specification of a suitable polyolefin material is as follows: a tensile strength in the range of 2,500 to 4,500 psi as determined by the ASTM designation D638–67T; a vicat softening point temperature in excess of 250° F. as determined by ASTM designation D1525–65T; a brittle point temperature of at least below −20° F. as determined by ASTM specification D746–64T; and a stiffness measurement in the range of 100,000 to 150,000 psi as determined by ASTM specification D747–63. Where the pallets are to be used in low temperature environments, as in refrigerated warehouses, the selected material should have a lower brittle point temperature, such as in the range of −40° F.

Materials which can be used for the manufacture of slip pallets according to the present invention include:

1. Polypropylene WM-110, furnished by the Shell Chemical Company of Houston, Texas. This is a rubber-modified polypropylene, the exact components of which are proprietory information of the Shell Oil Company.

2. Profax 7823, furnished by the Hercules Powder Company of Wilmington, Delaware. This is a copolymer of polypropylene and one or more other monomers, the exact components of which are proprietory information of the Hercules Powder Company.

3. Bestflex 401, furnished by Best Quality Plastics, Inc. of Denver, Colorado. This is a blend of high impact polypropylene and ethylene hexene copolymer, the exact components of which are proprietory information of Best Quality Plastics, Inc.

4. PlasKon PP 60–002, furnished by the Allied Chemical Company of Morristown, New Jersey. This is a linear polyethylene.

5. PlasKon AB 50–003, furnished by the Allied Chemical Company of Morristown, New Jersey. This is a copolymer of ethylene and one or more monomers, the exact components of which are proprietory information of Allied Chemical Company.

Sample pallets were tested for each of the specified materials and production runs of pallets were prepared for the Polypropylene WM-110, the Bestflex 401 and the PlasKon PP 60–002. These production pallets were manufactured as hereinbefore described, with a rough textured upper surface as produced by a sandblasted finishing and cooling roll. The upper surfaces of the pallets had a surface roughness of approximately 100 micro-inches in depth. The undersurface of these pallets was roughened slightly by the use of a sandblasted sizing roll which contacted the web only as a momentary line contact to produce a surface roughness of approximately 30 micro-inches in depth. These pallets were used for handling box loads of packaged beer cans at the Denver warehouse of the Coors brewery. Each boxload included 120 cartons and the load weighed approximately 3,800 pounds. The pallets performed satisfactorily through a large number of repeated uses, with very few causing trouble, although the tabs of some of the PlasKon PP 60–002 polyethylene pallets did tear away. This was anticipated since the tabs were subjected to both tension and hinging actions when loading and unloading box loads and polyethylene does not effectively resist repeated bending.

Figure 14:
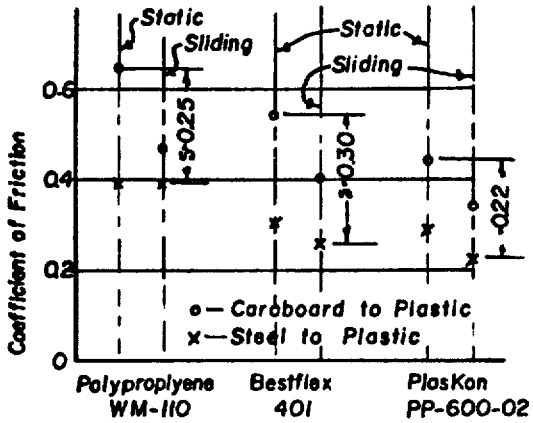
FIG. 14 is a diagram indicating various frictional coefficients which are significant in considering the behavior of a loaded pallet when a platen is being thrust underneath it.
Figure 11:
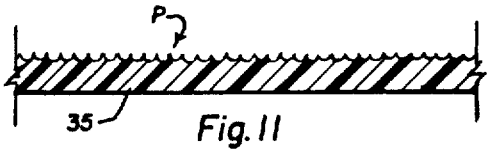
FIG. 11 is a fragmentary sectional view of the pallet, as taken from the indicated line 11—11 at FIG. 10, but on a greatly enlarged and exaggerated scale to better indicate, in a somewhat diagrammatic manner, the differences in texture between the upper and lower surfaces of the sheet.

Tests were made to establish the validity of the increased frictional effects by the use of a textured upper surface. Simple qualitative tests were made by turning pallets upside down to place the box load upon a smooth surface pallet and these tests quickly indicated that such an arrangement was not satisfactory because the pallets would slip and buckle and the box loads would shift significantly whenever they were picked up by the platen 24. Such demonstrated the need for a textured upper surface whereon the boxload was placed. FIG. 14 indicates diagrammatically, measurements of coefficients of sliding and static friction for the three materials used for production runs, the Polypropylene WM-110, the Bestflex 401 and the PlasKon PP 600–02. Friction measurements between a cardboard surface and a textured plastic surface of a pallet were significantly higher than the friction measurements between a smooth steel surface such as the platen 24 and the undersurface of the pallet. These differences, between the static friction of a box load upon the textured upper surface of the pallet and the sliding friction of the platen underneath the pallet ranged from 0.22 for polyethylene to 0.30 for Bestflex 401 and generally, it was observed that pallets manufactured from this latter material appeared to function better although such was a matter of degree.

Other frictional tests were made. The effect of texture was measured for the Bestflex 401 blend with the results set forth in the following table:

TABLE I

Effect of Texture Between Cardboard to Plastic (Bestflex 401)

| SURFACE | COEFFICIENT OF FRICTION |
|---|---|
| | (static) |
| Smooth | 0.40 |
| Fine Texture – approx. 30 micro-inches | 0.45 |
| Coarse Texture – approx. 100 micro-inches | 0.55 |

A similar test was made to show the effect of texture between steel and the Bestflex 401.

TABLE II

Effect of Texture Between Steel and Plastic (Bestflex 401)

| SURFACE | COEFFICIENT OF FRICTION |
|---|---|
| | (sliding) |
| Smooth | 0.35 |
| Fine Texture | 0.25 |

The obvious and apparent explanation of the increasing coefficient of friction between the plastic sheet and the cardboard as the texture of the sheet was roughened lies in the fact that the textured surface of the cardboard tended to interlock with the rougher texture of the plastic sheet. On the other hand, the tests of sliding friction between the steel and the plastic sheet showed an opposite result. A smooth sheet apparently caused air to be removed from between the steel plate and the smooth plastic sheet as evidenced by a suction effect between the surfaces. A slight roughening of the plastic surface apparently permitted air to remain between these surfaces, as evidenced by the lack of suction. This textured surface reduced the frictional resistance. The coefficient of sliding friction between a smooth polyolefin sheet and a smooth steel plate does not follow the standard pattern of that of most materials in that it may be greater than the coefficient of static friction. It is well known that the coefficient of friction will increase with an increase of temperature and apparently, the sliding friction produces heat between the sheet and plate sufficient to produce such an effect. The slight texturing of the polyolefin sheet apparently retains air between the sheet and plate thereby reducing the friction and apparently dissipating the heat.

Figure 12:
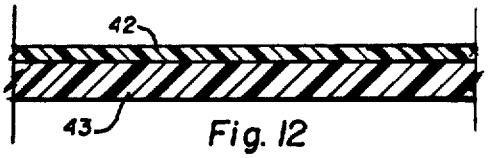
FIG. 12 is a fragmentary sectional view, similar to FIG. 11, but showing the pallet as being manufactured from a laminate.

The above described studies demonstrate that other arrangements are possible for the manufacture of slip pallets. For example, the pallet can be formed of laminated plastic sheets as shown at FIG. 12, providing that the upper surface layer 42 has a greater frictional resistance than the undersurface layer 43. A sample sheet using Polypropylene WM-110 as the upper surface 42 and PlasKon 60–002 as the undersurface 43 demonstrated that a laminated slip pallet would function satisfactorily.

Figure 13:
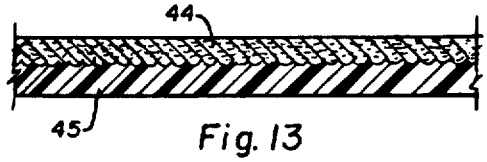
FIG. 13 is a fragmentary sectional view similar to FIG. 11, but showing another modified construction where the material forming the pallet is a laminate of a plastic sheet and an absorbent, cloth-like material.
Figure 15:
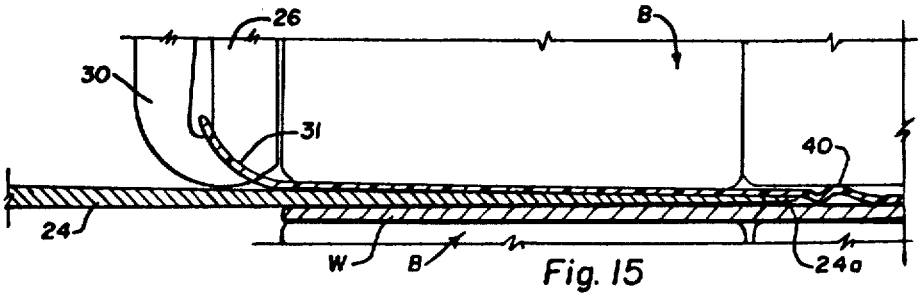
FIG. 15 is a fragmentary diagrammatic view similar to the showing at FIG. 8, but on an exaggerated scale to better illustrate the behavior of a loaded slip pallet whenever a platen is being thrust underneath it.
Figure 16:
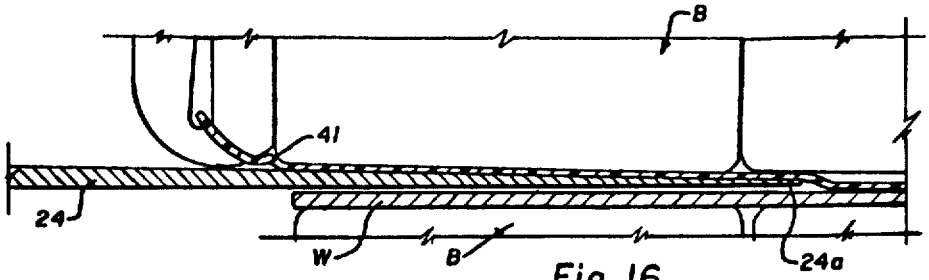
FIG. 16 is a diagrammatic view similar to FIG. 15, but illustrating the behavior of a loaded slip pallet whenever the platen is being pulled out from underneath it.

A further modification of the invention was proposed to protect the box load B against moisture, as where one or more cans in the box load would leak. The moisture from such a leak would normally be absorbed by the cardboard boxes and could cause the boxes to break apart very easily. To avoid this, it was proposed to provide a laminate having an absorbent sheet at the upper surface as indicated at FIG. 13. The absorbent layer 44 could be of wood or cardboard affixed to a substrate 45 of a material such as PlasKon PP 60–002. Another material for the upper surface which can be used is a fibrous polyethylene mat known as TYVEC, a registered trademark of E. I. DuPont of Wilmington, Delaware.

We have now described our invention in considerable detail setting forth various embodiments and alternatives to the same. However, it is obvious that others skilled in the art can devise and build alternate and equivalent constructions and operate slip pallets in a manner equivalent to that herein described. Hence, we desire that our protection be limited, not by the constructions illustrated and described, but only by the proper scope of the appended claims.

We claim:

[1. A slip pallet for holding a load of cardboard boxes, or the like, and carried by a platen which slides underneath the slip pallet and its box load for loading and unloading the same onto and off from the platen, said pallet comprising:

a tough, pliable sheet of single thickness of synthetic thermoplastic resin having a thickness in the range of approximately 20 to 125 mils;

a central area whereon the box load is placed;

a tab means alongside at least one edge of this central area folded upwardly along the edge of the central area to be gripped and held whenever the platen is moving underneath the pallet from the tab side; and a modified upper surface at the central area adapted to enhance the contact thereof with the cardboard surfaces of the box load upon the pallet sufficient to increase the static frictional resistance between the box load and the pallet to a degree which exceeds the sliding frictional resistance between the pallet and the platen.]

[2. The slip pallet defined in claim 1, wherein:

said thermoplastic resin is a polyolefin resin characterized by a tensile strength in the range of 2,500 to 4,500 psi and a vicat softening point temperature in excess of 250° F. ]

[3. The slip pallet defined in claim 2, wherein:

the said modified upper surface is a texture having a roughness such that the coefficient of static friction between the box load and upper surface exceeds the sliding coefficient of friction between the platen and the undersurface of the slip pallet by at least 0.15.]

[4. The slip pallet defined in claim 1, wherein:

said sheet is a laminate consisting of an upper layer and a lower layer of different synthetic thermoplastic resin materials as a unitary sheet with the material of the upper layer, forming said modified surface, having a natural frictional resistance significantly greater than that of the lower layer. ]

[5. The slip pallet defined in claim 1, wherein:

said sheet is a laminate consisting of an upper layer of fibrous absorbent material and a lower layer of synthetic thermoplastic resin material as a unitary sheet.]

[6. The slip pallet defined in claim 2, wherein:

the upward tab fold includes a permanent crease at the fold.]

[7. The slip pallet defined in claim 2 wherein the thermoplastic resin is polypropylene and the upward tab fold includes a permanent crease at the fold. ]

[8. The slip pallet according to claim 7 wherein the said modified upper surface is produced by a texture having a roughness not less than approximately 60 micro-inches, the undersurface of the central area is modified by texturing the same to produce a roughness of not over approximately 30 micro-inches, but sufficient to permit air to be present between the pallet and the platen and the coefficient of static friction between the box load and upper surface exceeds the sliding coefficient of friction between the platen and the undersurface of the slip pallet by at least 0.15.]

[9. A slip pallet according to claim 1 wherein when in use the coefficient of static friction between the box load and the upper surface exceeds the sliding coefficient of friction between the platen and the under surface of the pallet by at least 0.15.]

[10. A combination of the slip pallet of claim 1 with its upper surface supporting a load of cardboard boxes, or the like, and its lower surface being on a platen, and the coefficient of static friction between the box load and the upper surface exceeding the sliding coefficient of friction between the platen and the under surface of the pallet by at least 0.15.]

*11. A reuseable slip pallet adapted to hold a load of cardboard boxes or the like, and to be carried upon a platen which slides underneath the loaded slip pallet to move the slip pallet onto and off of the platen, the platen including a pull-push means to grip an edge of the pallet and to pull and slide the loaded pallet onto the platen and to push and slide the loaded pallet off of the platen;*

*said pallet having a central area whereon the box load is placed;*

*a tab along the side of at least one edge of said central area, partially folded upwardly along the edge of said central area to be gripped and held by the aforesaid gripping means;*

*said pallet being comparatively thin and flexible and thus being yieldable whereby it is subject to rippling and buckling effects when the platen is sliding under the loaded pallet, but is capable of preventing excessive folding or tearing due to such rippling and buckling effects, said pallet being formed of a tough, pliable sheet of single thickness of polyolefin resin having a thickness in the range of approximately 20 to 125 mils, a tensile strength in the range of 2,500 to 4,500 p.s.i. and a vicat softening point temperature in excess of 250° F.;*

*with the aforesaid tab fold being a compression-formed crease in at least one surface of the sheet at the boundary between said central area and said tab and constituting a shallow groove which does not impair the strength of the pallet between said central area and said tab; and*

*a modified upper surface at said central area adapted to increase the static frictional resistance between the box load and the pallet to a degree which exceeds the sliding frictional resistance between the pallet and the platen and wherein the difference in the coefficient of friction between the upper and lower surfaces exceeds 0.15, whereby said pallet will hold the box load without significant slipping between the box load and pallet when the platen is sliding under the pallet.*

*12. The slip pallet defined in claim 11 wherein said sheet is a laminate consisting of an upper layer and a lower layer of different synthetic thermoplastic resin materials as a unitary sheet with the material of the upper layer, forming said modified surface, having a natural frictional resistance significantly greater than that of the lower layer.*

*13. The slip pallet defined in claim 11 wherein said sheet is a laminate consisting of an upper layer of fibrous absorbent material and a lower layer of synthetic thermoplastic resin material as a unitary sheet.*

*14. The slip pallet defined in claim 11 wherein the thermoplastic resin is polypropylene.*

*15. A slip pallet according to claim 14 wherein the said modified upper surface is produced by a texture having a roughness not less than approximately 60 micro-inches, the undersurface of the central area is modified by texturing the same to produce a roughness of not over approximately 30 micro-inches but sufficient to permit air to be present between the pallet and the platen.*

*16. A combination of the slip pallet of claim 11 with its upper surface supporting a load of cardboard boxes or the like, and its lower surface being on a platen, and the coefficient of static friction between the box load and the upper surface exceeding the sliding coefficient of friction between the platen and the undersurface of the pallet by at least 0.15.*

*17. A slip pallet defined in claim 11 wherein the said modified upper surface is produced by a texture having a roughness of not less than approximately 60 micro-inches.*

*18. The slip pallet defined in claim 12 wherein the upper layer is polypropylene and the lower layer is polyethylene.*

* * * * *